United States Patent [19]

Trakas

[11] Patent Number: 5,136,141
[45] Date of Patent: * Aug. 4, 1992

[54] INTEGRAL SPRUE BUSHING ASSEMBLY

[75] Inventor: Panos Trakas, Addison, Ill.

[73] Assignee: Melt Design, Inc., Lombard, Ill.

[*] Notice: The portion of the term of this patent subsequent to Nov. 21, 2006 has been disclaimed.

[21] Appl. No.: 606,509

[22] Filed: Oct. 31, 1990

[51] Int. Cl.$^5$ .................................................. B29C 45/00
[52] U.S. Cl. ................................. 219/421; 219/424; 425/549
[58] Field of Search ................... 219/420–424, 219/523, 530, 541, 544; 425/549, 568, 552, 570, 566

[56] References Cited

U.S. PATENT DOCUMENTS

| | | | |
|---|---|---|---|
| 4,238,671 | 12/1980 | Gellert | 219/421 |
| 4,273,525 | 6/1981 | Reitan | 425/549 |
| 4,279,588 | 7/1981 | Gellert | 425/568 |
| 4,304,544 | 12/1981 | Crandell | 425/549 |
| 4,344,750 | 8/1982 | Gellert | 425/548 |
| 4,355,460 | 10/1982 | Gellert | 29/611 |
| 4,386,262 | 5/1983 | Gellert | 219/424 |
| 4,403,405 | 9/1983 | Gellert | 29/611 |
| 4,424,622 | 1/1984 | Krause | 29/611 |
| 4,557,685 | 12/1985 | Gellert | 425/549 |
| 4,576,567 | 3/1986 | Gellert | 425/549 |
| 4,583,284 | 4/1986 | Gellert | 29/611 |
| 4,635,851 | 1/1987 | Zecman | 239/133 |
| 4,642,043 | 2/1987 | Schwarzkopf | 425/547 |
| 4,882,469 | 11/1989 | Trakas | 219/421 |
| 4,899,435 | 2/1990 | Trakas | 29/611 |

OTHER PUBLICATIONS

"Runnerless Molding Heating Components & Assessories" (Tempco Electric Heater Corp.), 1986, pp. 15–20.

Primary Examiner—Bruce A. Reynolds
Assistant Examiner—Michael D. Switzer
Attorney, Agent, or Firm—Lockwood, Alex, Fitzgibbon & Cummings

[57] ABSTRACT

A sprue bushing with an integral casing construction which as improved heat transfer characteristics and a method of making the same are described. A cylindrical bushing body having a first, preselected uniform diameter has a cavity formed therein which axially extends within the bushing body for a predetermined length. A bushing inner core which is integral with the bushing casing is formed in the cavity and extends between the two ends of the bushing body. One or more heating elements in the form of coil heaters may be inserted into the bushing body cavity and a thermally conductive material is deposited into the cavity to fill the remainder of the cavity. When filled, the bushing body is heated to melt the thermally conductive material around the heating element(s) to form a unified heater assembly in the annular cavity. A melt runner passage is then drilled through the inner core.

12 Claims, 3 Drawing Sheets

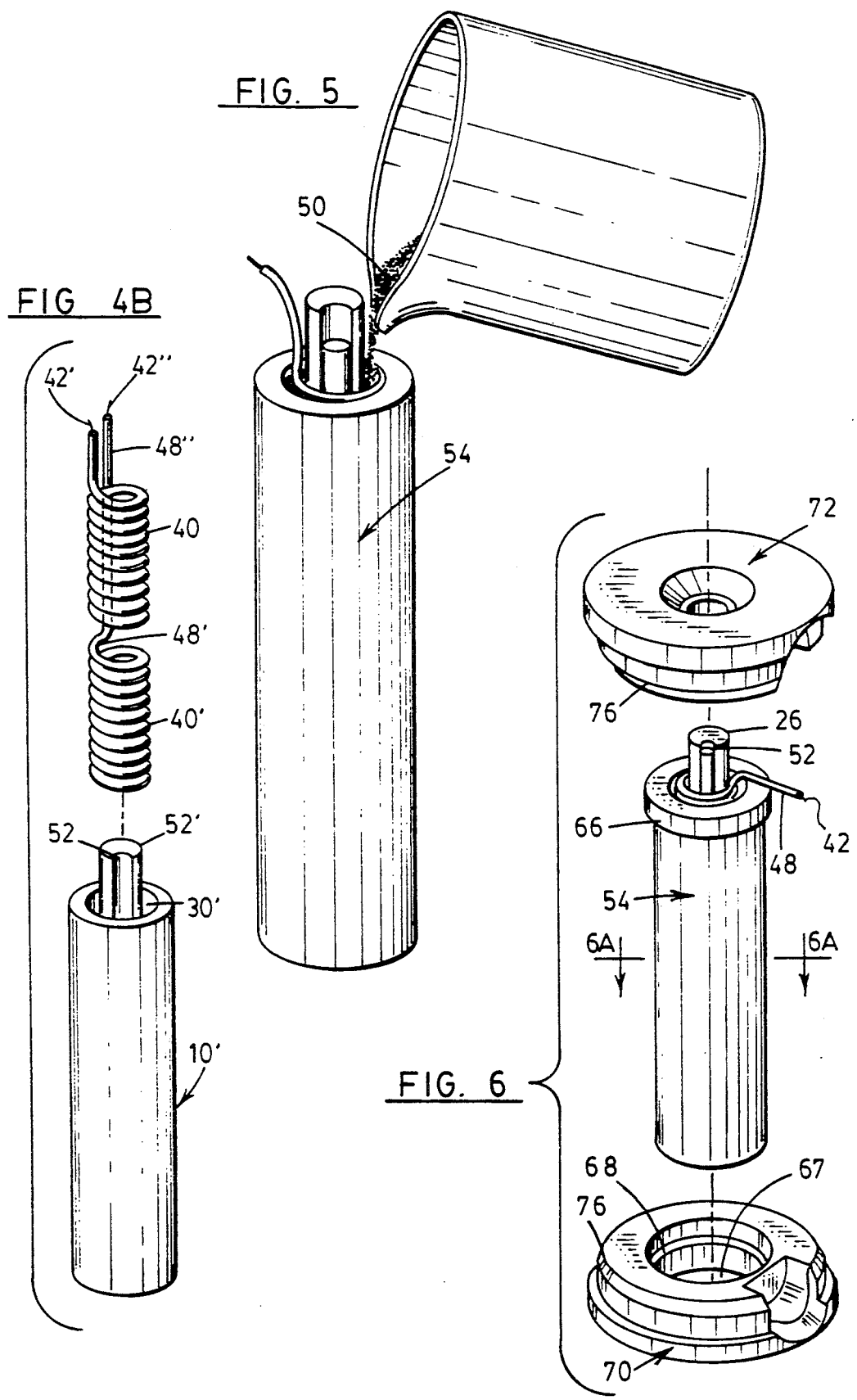

INTEGRAL SPRUE BUSHING ASSEMBLY

BACKGROUND AND SUMMARY OF THE PRESENT INVENTION

The present invention relates generally to sprue bushings for injection molding machines and, more particularly, to internally-heated sprue bushings having an integral construction and an internal heater unit having a highly thermally conductive material surrounding an internal heater. In this regard, one important aspect of the present invention is directed to an internally heated bushing assembly which is especially suited to handle pressurized melt, which assembly includes a unitary bushing casing-core element having an integral outer sidewall, endwall and inner core having a melt running passage therethrough.

Sprue bushings are commonly used in injection molding to provide a heated flowpath for conveying molten plastic or melt from an injection molding machine manifold or nozzle to an injection mold cavity opening. Typically, these sprue bushings may include a separate bushing casing portion housing a heating element and a separate, inner bushing core portion through which the melt flows. The bushing core is usually disposed in the center of the bushing casing and extends axially through the casing between the bushing inlet and an outlet end thereof with one end of the core projecting through a hole in the casing. Other sprue bushings such as that shown in U.S. Pat. No. 4,882,469 have an integral casing-core construction wherein the casing and core are formed from one piece with an annular cavity formed therebetween which accommodate a preformed tubular heater element. In either of such sprue bushing constructions, the inner core is surrounded by a tubular or spiral heating element set in a particulate, compacted refractory material. The refractory material insulates the heating elements and conveys or transmits heat from the heating element(s) to the center core portion of the bushing.

Although the refractory material transmits heat adequately to the bushing center core, it is desirable to increase the effectiveness of heat transfer from the heating element to the inner core. This is accomplished in the present invention by surrounding the heating means disposed in the bushing inner core with a highly thermally conductive material, such as copper or an alloy thereof. The surrounding layer of the highly thermally conductive material provides for efficient heating of the inner core melt runner passage for substantially the entire length thereof. Significantly, this surrounding thermal layer, or cladding, may extend between the point where the bushing inner core meets the head member at the melt inlet of the sprue bushing and the rear inner wall of the bushing casing near the bushing outlet. The transfer of heat through the surrounding thermal layer of thermally conductive material is effectively accomplished along substantially the entire length of the center core, thereby effectively improving the heat distribution along the melt runner passage.

The present invention provides the above-mentioned benefits and is directed to a novel sprue bushing assembly in which the bushing inner core or central melt runner passage has a heating element disposed therein with a surrounding layer of a highly thermally conductive material applied thereto, such as copper. As such, these sprue bushing assemblies are characterized by a unique bushing casing-core element which includes an unitary casing having an outer sidewall, endwall and elongated inner core integrally joined together, the inner core having a melt runner passage extending therethrough which is heated by a heating element surrounding the inner core and embedded in a surrounding layer of copper.

In a sprue bushing assembly incorporating the principles of the present invention, a cylindrical metal blank is provided with a cavity axially extending within the blank. An elongated inner core member, which is integrally formed with the bushing casing endwall is spaced apart from the outer wall of the bushing casing. The cavity contains at least one heating element in the form of a coil heater which encircles the inner core from between the bushing inlet and the bushing outlet. The open, surrounding space which occurs in the casing cavity between the heating element and the bushing is filled with a powdered or particulate thermally conductive material to form a heater-bushing blank assembly. When filled, the heater-bushing blank assembly may then be heated until the particulate thermally conductive material melts and solidifies in the casing cavity, thereby forming all of the components which fill the casing cavity, i.e., the heating element and thermally conductive material, into a unified mass which is substantially free of voids. A head member containing electrical conduction and temperature sensing wires to the heating element is then added to the top portion of the bushing-heater assembly and the cap then firmly welded to the bushing assembly. An opening is drilled through the bushing core to provide a melt flowpath. The outlet end of the bushing is then finished to form a final bushing outlet tip.

Accordingly, it is a general object of the present invention to provide a method of manufacturing an improved sprue bushing from a single metal blank having improved heat transfer means operatively associated with the inner core and wherein the inner core is integral with the bushing casing which eliminates melt leakage to the heating element and resulting heater element burnout.

Another object of the present invention is to provide an injection molding sprue bushing in which the bushing core has a heating element disposed therein which is surrounded by a layer of thermally conductive material for substantially the entire length of the bushing core.

A yet further object of the present invention is to provide an internally heated sprue bushing having an inner core encircled by a heating element encased in and in which a thermowell is disposed in contact with the inner core.

Still another object of the present invention is to provide a sprue bushing for injection molding having an outer bushing casing, an inner core axially extending through the bushing casing, the inner core having two heating elements surrounding it and disposed longitudinally within an annular cavity formed between the inner core and bushing casing, the heating element(s) being surrounded by a highly thermally conductive material.

These and other objects, features and advantages of the present invention will be apparent from the following detailed description, taken in conjunction with the accompanying drawings wherein like reference numerals refer to like parts.

BRIEF DESCRIPTION OF THE DRAWINGS

In the course of this description, reference will be made to the attached drawings in which:

FIG. 4B is a view of an alternate embodiment showing the step of two heater elements being assembled within the bushing casing cavity;

FIG. 5 is a view of the step of forming the thermally conductive layer in the bushing-casing cavity which surrounds the neater element(s);

FIG. 6 is an exploded perspective view showing how the bushing end cap portions are assembled onto the bushing-heater assembly;

DETAILED DESCRIPTION OF THE PREFERRED EMBODIMENTS

Figure 1:
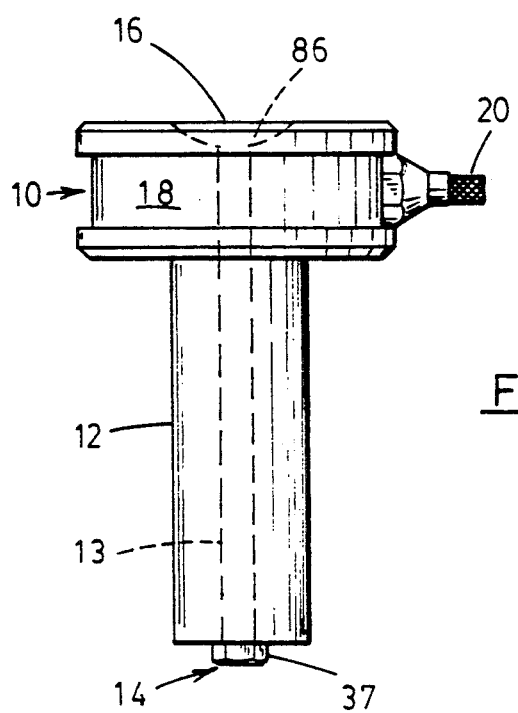
FIG. 1 is an elevational view of a sprue bushing constructed in accordance with the principles of the present invention.

Referring to the drawings and in particular to the FIGS. 1-8, a sprue bushing 10, constructed in accordance with the principles of the present invention is shown as having an elongated bushing body 12 extending between the bushing outlet end 14 and the bushing inlet end 16. An enlarged end cap 18 is located at the bushing inlet end and houses a shielded electrical cable 20 located in a connection cavity 21 and extends outwardly from the end cap 18. The cable 20 contains the necessary electrical wires which lead to an external source of power (not shown) which energizes the bushing and monitors the temperature of the bushing.

Figure 2:
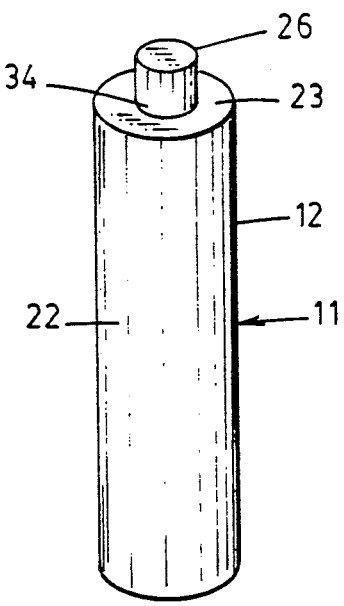
FIG. 2 is a perspective view of a metal blank from which the sprue bushing of FIG. 2 is formed and showing the formation of a stem on the sprue bushing blank.
Figure 4A:
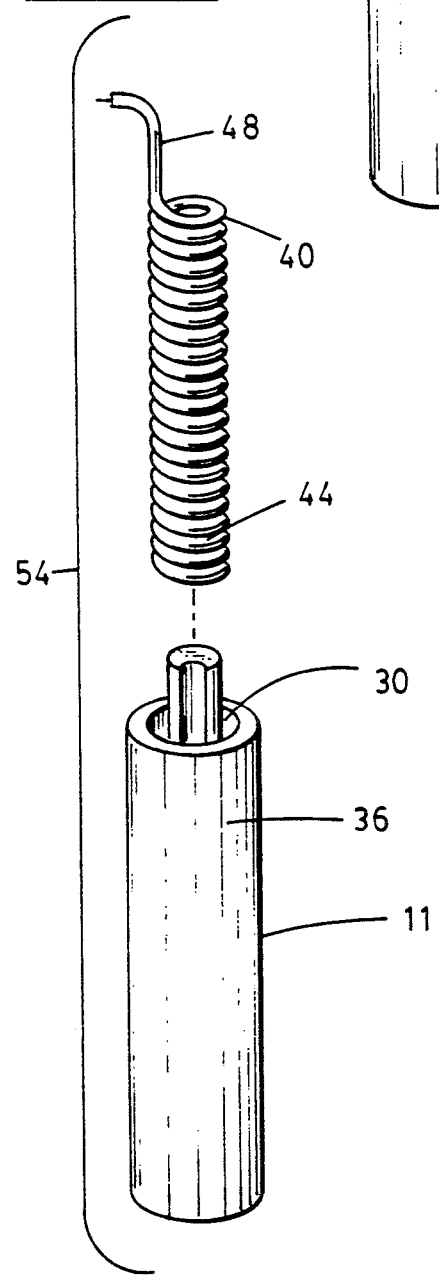
FIG. 4A is an exploded perspective view of the bushing casing or FIG. 3 showing how the heater element is assembled into the bushing-casing cavity.

The first step in making the bushing 10 is forming a metal blank 22 into an elongated cylinder having a preselected, uniform diameter such as by machining, casting or electric discharge machining ("EDM"). As illustrated in FIG. 2, the top portion 23 of the blank 22 may then be machined to form an initial bushing body 11 which has an elongated stem 26 centrally disposed in the body 11 and axially extending therefrom. The stem 26 defines the initial outer diameter of the bushing inner core 34. Although the stem 26 is shown as protruding past the end of the bushing body 11, if desired, the stem 26 may be formed at a later stage in the manufacturing process by removing an upper portion of the bushing outer sidewall 36.

Figure 3:
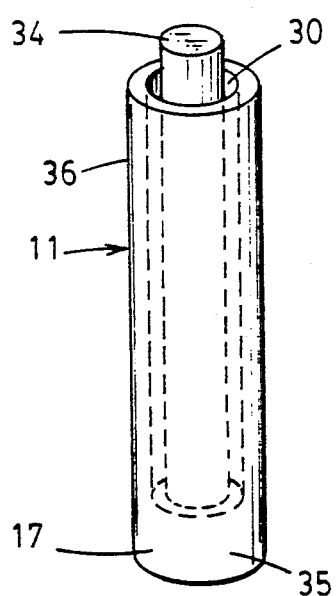
FIG. 3 is a perspective view of the bushing blank of FIG. 2 showing the location and extent of the bushing-casing annular cavity in the blank.

In accordance with one aspect of the present invention, and as illustrated in FIG. 3, an elongated annular cavity 30 is formed in the bushing body 12. This elongated cavity 30 defines an inner core 34 of the bushing 10 by separating it from the bushing casing or outer sidewall 36. The annular cavity 30 extends for substantially the entire length of the bushing body 11, and terminates near the outlet end 14, leaving a bushing endwall 17 which is integral with the bushing outer sidewall 36 and the elongated inner core 34. As used in the present invention and in this detailed description, "integral" refers specifically to the bushing body construction, i.e., that the bushing inner core 34, the bushing body endwall 17 and the bushing body outer sidewall 36 are integrally formed from a single piece of metal such that there are no joints, welded or otherwise disposed along the inner core 34 and the melt runner passage 13. Preferably, an excess bushing body end or outlet portion 35 is left on the bushing body 11 near the endwall 17 so that the bushing tip 37 can be machined to a desired configuration.

An internal heating means, preferably in the form of a coil heater 40 is then inserted into the annular cavity 30. The tubular coil heater 40 extends for substantially the entire length of the annular cavity 30 and has an open extension portion 48 which extends out of the annular cavity 30 and which is attached to the power source of the bushing 10. As shown specifically in the embodiment of FIGS. 4B and 8, in which the reference numerals are common to those elements of the single zone bushings described herein but differ by the addition of a "prime" thereto, the bushing 10' may have two tubular coil heaters 40', 40" inserted into its annular cavity 30'. The first coil heater 40' occupies a portion of the annular cavity 30' nearest the intended bushing outlet end 14', and the second coil heater 40" occupies a portion of the annular cavity 30' rearward of, or adjacent to, the first coil heater 40'. In such an embodiment, the coil heaters 40', 40" have respective extension portions 48', 48" which extend through part of the annular cavity 30' which is not occupied by the coils of the heaters encircling the inner core 34'.

Figure 6A:
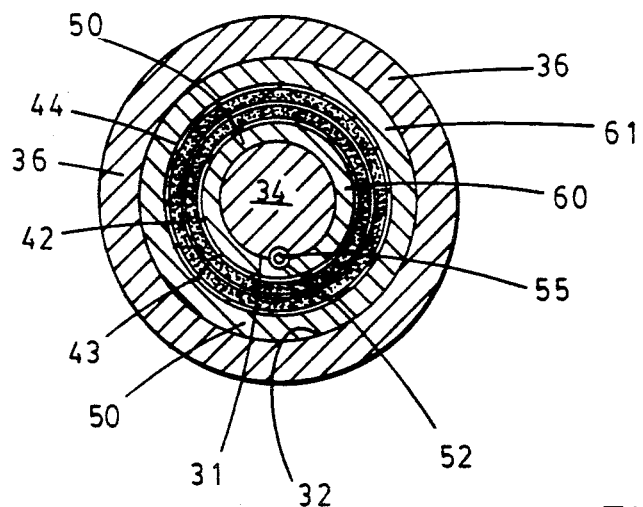
FIG. 6A is a cross-sectional view of the bushing of FIG. 6 taken along lines 6A—6A.
Figure 8:
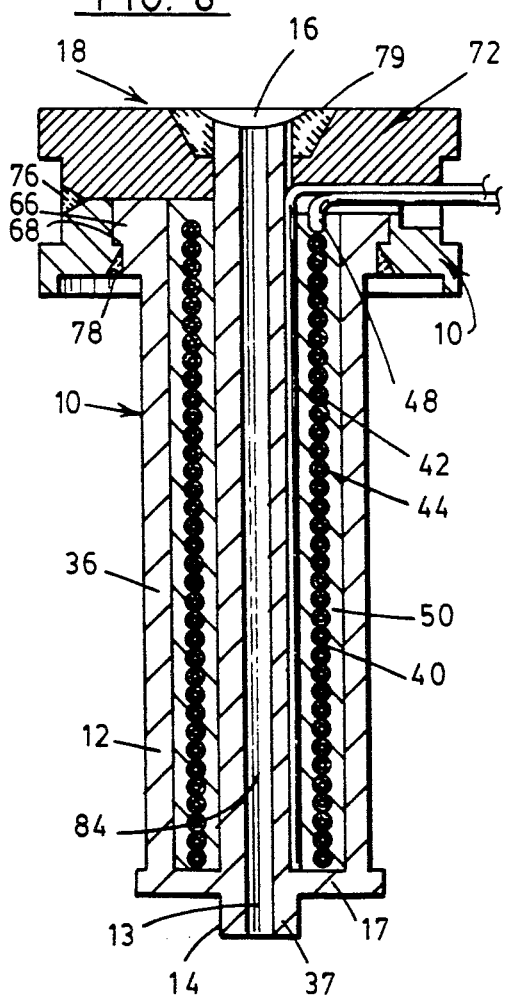
FIG. 8 is a cross-sectional view of a completed dual zone sprue brushing constructed according to the principles of the present invention.

The coil heater(s) used in the bushing can be of conventional design, having one or more resistance wires 42 which are embedded in an electrically insulative material 43, such as magnesium oxide, and which extend for the entire length of the coil heater within an external, formable sheath 44. As shown in FIG. 6A, the heater 40 is sized to be slidingly received over the inner core 34 so that one or more portions 60, 61 of the annular cavity 30 remain open.

The remainder of the annular cavity 30, i.e., the space(s) between the inner core exterior surface 31, the coil heater 40 and the bushing sidewall inner surface 32 is filled with a particulate or powdered highly thermally conductive material 50, such as copper or an alloy thereof, to form a bushing-heater assembly 54. The bushing-heater assembly 54 is preferably shaken or vibrated to evenly distribute the highly thermally conductive material 50 in the open spaces 60, 61 of the annular cavity 30.

The bushing-heater assembly 54 is then heated in a vacuum furnace until the particulate thermally conductive material 50 is melted and the molten material flows throughout the remaining spaces 60, 61 of the annular cavity to completely fill the annular cavity 30 and to form a unified mass which is securely seated within the annular cavity 30. Melting the particulate material 50 under a partial vacuum results in the copper or copper alloy fusing to both the elongated inner core member 34 and the coil heater 40 to form a cladding of the heater 40, thereby improving the bond therebetween. After the particulate material 50 is melted, the bushing heater-assembly 54 is removed from the furnace and allowed to cool.

The bushing-heater assembly 54 may be completed by the insertion of means for monitoring the temperature of the inner core 34 in the form of one or more thermowells 52, 52' which may be disposed in corresponding slots 53 of the inner core 34. Alternatively, the thermowells may be disposed adjacent the exterior surface thereof, extending along substantially the entire length of the inner core member 34. Respective thermocouple leads 55, 55' are inserted into the thermowells 52, 52' and extend therein for substantially the entire length thereof. The thermowells 52, 52' become firmly embedded in the bushing annular cavity 30 as a result of the forming of the heater element cladding (explained above) and thus, if the thermocouple should fail in operation, it can be easily removed and replaced at the bushing end cap 18 and the sprue bushing need not be discarded.

Figure 7:
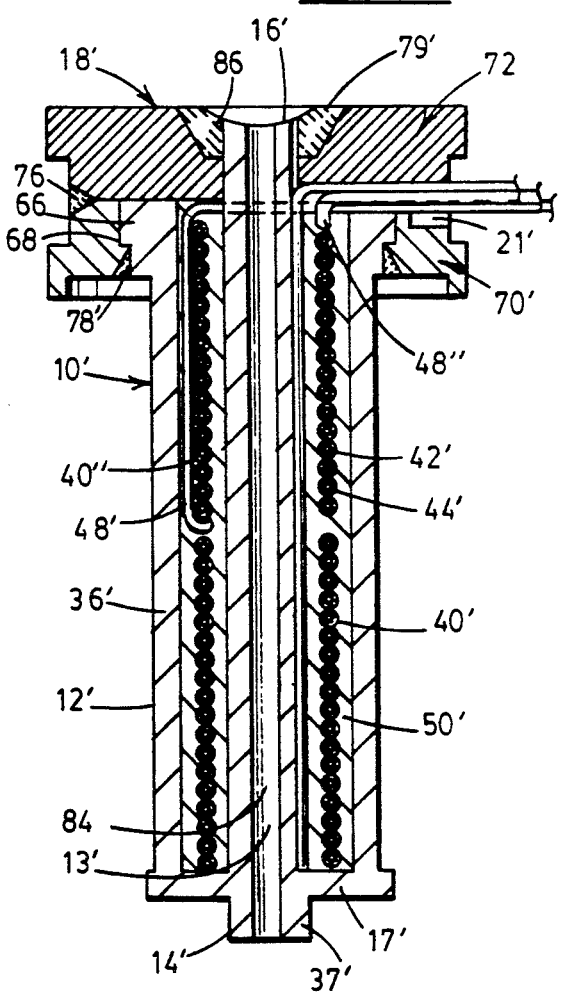
FIG. 7 is a cross-sectional view of a completed dual zone sprue bushing constructed according to the principles of the present invention.

After the unified heater element mass has been seated in the annular cavity 30, the top of the bushing body 12 can be further machined as illustrated in FIG. 7 to provide radially extending flanges 66 which abut complementary shoulders 68 located in the bushing bottom half 70 of the bushing end cap 18. The end cap bottom 70 has an opening 67 to accommodate the final diameter of the bushing assembly and slides over the bushing body 11 to engage the bushing flanges 66. The top half 72 of end cap 18 slides over the bushing stem 26 to complete the formation of bushing end cap 18. The top and bottom end cap halves each have similar cable connection recesses 21 located therein to accommodate the insertion of a shielded cable connection 20 therein which contains the external power wires which are connected to the one or more coil heater extensions 48, 48'.

After the halves are assembled onto the bushing body 11, they are joined together, as by welding, where they meet at an exterior chamfer 76 around the entire periphery of the head cap 18. The bottom half 70 of end cap 18 may be welded to the bushing body 11, at an inner chamfer 78 which extends around the periphery of the bottom end cap opening 67. A final weld 79 joins the end cap top half to the inner core 34 where the top cap 72 meets the inner core 34. (FIG. 7.) The runner passage 13 is then drilled through the center of the inner core 34 to provide a melt flowpath 84 which extends through the sprue bushing body 12 from the inlet end 16 to the outlet end 14. After the runner passage 13 is drilled, the top of the end cap 18 may be machined to provide a well 86 to receive the injection molding machine nozzle or manifold outlet. Alternatively, the bottom half 70 of the end cap 18 can be formed integrally with the bushing body 12, if the bushing body 12 is chosen from stock having a suitable outer diameter.

Finally, the outlet end 14 of the sprue bushing body 12 is finished by machining to remove the excess end portion 35 to form the desired type of tip 37.

It will be appreciated that the embodiments of the present invention which have been discussed are merely illustrative of some of the applications of this invention and that numerous modifications may be made by those skilled in the art without departing from the true spirit and scope of this invention.

I claim:

1. An internally heated sprue bushing assembly having an inlet for receiving pressurized melt and an outlet for the discharge of the pressurized melt, said sprue bushing assembly comprising:

a bushing casing-core element having an integral outer sidewall and an endwall and an elongated inner core, the outer surface of said elongated inner core and the inner surface of said sidewall defining a generally annular compartment within said bushing casing;

at least one heating means disposed within said annular component in surrounding relation to said elongated inner core, said at least one heating means axially extending a preselected length within and occupying a portion of said annular compartment;

a thermally conductive material occupying the remainder of said annular compartment; and a melt runner passage in said elongated inner core interposed between and in flow communication with said inlet and outlet of said sprue bushing assembly.

2. The sprue bushing assembly of claim 1, wherein said thermally conductive material is copper or an alloy thereof.

3. The sprue bushing assembly of claim 1, further including temperature monitoring means disposed in said annular compartment along said elongated inner core.

4. The sprue bushing assembly of claim 12, wherein said annular compartment includes at least one thermowell passage operatively associated with said at least one heating means, said at least one thermowell passage being adapted to receive a separate removable thermocouple lead therein for monitoring the heat applied by said heating means to said elongated inner core.

5. The sprue bushing assembly of claim 1, further including two heating means, said two heating means including two tubular coil heaters, one of said two tubular coil heaters being disposed in said annular compartment proximate to said bushing outlet end and the other of said two tubular coil heaters being disposed in said annular compartment adjacent to said one tubular coil heater.

6. An internally heated sprue bushing assembly having an inlet for receiving pressurized melt and an outlet for the discharge of the pressurized melt, the sprue bushing assembly comprising:

a unitary bushing casing-core element having an integral elongated outer sidewall, an endwall and an elongated inner core, the elongated inner core having an internal portion containing a melt runner passage between and in flow communication with the inlet and the outlet of the sprue bushing assembly, the outer surface of said elongated inner core distinct outer portion and the inner surface of said outer sidewall defining a generally annular compartment within said bushing casing-core element, at least one heating means being disposed in surrounding relation to said elongated inner core, said at least one heating means axially extending a preselected length within and occupying a portion of said annular compartment, and a mass of thermally conductive material occupying the remainder of said annular compartment.

7. The sprue bushing assembly of claim 6, wherein said elongated inner core has an axial length which is greater than an axial length of said integral outer sidewall of said bushing casing-core element, said inner core further forming a portion of said sprue bushing pressurized melt inlet.

8. The sprue bushing of claim 6, further including two heating means in the form of two heating elements coiled around said elongated inner core, one of said two heating elements being disposed in said annular compartment proximate to an end of said sprue bushing and the other of said two heating elements being disposed in said annular compartment adjacent said one heating element.

9. The sprue bushing assembly of claim 6, wherein said thermally conductive material includes copper or an alloy thereof and said at least one heating means includes a coil heater sized to be slidingly received on said elongated inner core distinct outer portion.

10. An internally heated sprue bushing assembly having an inlet for receiving pressurized melt and an outlet for the discharge of said pressurized melt, said sprue bushing assembly comprising;
- a unitary bushing casing-core element having an integral outer sidewall, an endwall and an elongated inner core, the outer surface of said elongated inner core and the inner surface of said sidewall defining a generally annular compartment extending axially within said bushing casing;
- first and second heating means disposed in said annular compartment in surrounding relation to said elongated inner core, said first heating means axially extending a preselected length within said annular compartment and being disposed therein proximate to said bushing outlet end, said second heating means axially extending a preselected length within said annular compartment and being disposed adjacent said first heating means, said first and second heating means occupying a portion of said annular compartment;
- a unified mass of highly thermally conductive material occupying the remainder of said annular compartment; and
- a melt runner passage in said elongated inner core interposed between and in flow communication with said inlet and outlet of said sprue bushing assembly.

11. The sprue bushing assembly of claim 10, further including first and second means for monitoring the temperature of said elongated inner core during operation of said sprue bushing assembly, said first and second temperature monitoring means being respectively operatively associated within said first and second heating means.

12. The sprue bushing assembly of claim 10, wherein said first and second heating means include tubular coil heaters.

* * * * *